US005556048A

United States Patent [19]
Hashimoto

[11] Patent Number: 5,556,048
[45] Date of Patent: Sep. 17, 1996

[54] BACKLASH PREVENTIVE DEVICE FOR USE IN A DUAL BEARING TYPE REEL FOR FISHING

[75] Inventor: Hiroshi Hashimoto, Tokyo, Japan

[73] Assignee: Daiwa Seiko, Inc., Tokyo, Japan

[21] Appl. No.: 302,425

[22] Filed: Sep. 8, 1994

[30] Foreign Application Priority Data

Sep. 14, 1993 [JP] Japan .................. 5-054383 U

[51] Int. Cl.⁶ .................................................. A01K 89/02
[52] U.S. Cl. .......................................................... 242/288
[58] Field of Search ...................... 242/288, 314, 242/315

[56] References Cited

U.S. PATENT DOCUMENTS

| | | | |
|---|---|---|---|
| 2,720,365 | 10/1955 | Kovalchik et al. | 242/315 X |
| 4,549,703 | 10/1985 | Atobe | 242/288 |
| 4,572,454 | 2/1986 | Furomoto | 242/288 |
| 4,710,689 | 12/1987 | Uetsuki et al. | 242/288 X |
| 4,714,208 | 12/1987 | Holahan et al. | 242/288 |
| 5,273,235 | 12/1993 | Sato | 242/288 |

FOREIGN PATENT DOCUMENTS

| | | | |
|---|---|---|---|
| 0050676 | 4/1983 | Japan | 242/288 |
| 3-76464 | 7/1991 | Japan | . |
| 4-7180 | 2/1992 | Japan | . |

*Primary Examiner*—Daniel P. Stodola
*Assistant Examiner*—Emmanuel M. Marcelo
*Attorney, Agent, or Firm*—Longacre & White

[57] ABSTRACT

A backlash preventive device using an eddy current of a magnet for use in a dual bearing type reel. A conductor is provided on one side of a spool supported rotatably between the two side plates of a reel main body. There is formed in the side plate on the side of the conductor a through hole through which the spool can be mounted and removed. A unit body including a bearing portion for supporting a spool shaft is removably fitted into the through hole in a threaded manner. A spool brake device for allowing the conductor to generate an eddy current is disposed in the unit body. An adjust body for rotationally adjusting the mutually opposing positions of magnets provided in the spool brake device is rotatably mounted in the central portion of the outside of the unit. Thus, the adjust body can be held in a sufficient size to facilitates a spool brake force adjusting operation.

8 Claims, 4 Drawing Sheets

BACKLASH PREVENTIVE DEVICE FOR USE IN A DUAL BEARING TYPE REEL FOR FISHING

BACKGROUND OF THE INVENTION

The present invention relates to an improved backlash preventive device using magnets for use in a dual bearing type reel for fishing.

As a conventional backlash preventive device which prevents excessive rotation of a spool by using an eddy current to be generated by magnets when a fishing line of a dual bearing type reel for fishing is played out, there is known a device disclosed in Japanese Patent Examined Publication No. Hei. 4-7180 in which a spool brake device using magnets is disposed in a unit body removably fitted into a side plate and supporting a spool shaft in order to facilitate the mounting and removal of a spool, and an adjust body for adjusting the position of the spool brake device in the axial direction is supported at a position shifted forwardly from the spool shaft.

However, in the above-mentioned conventional backlash preventive device, since the adjust body is provided at a position shifted forwardly from the spool shaft of the unit body, the size of the adjust body is limited in view of the fact that the unit body must be removably mounted onto the side plate, so that the rotational operation of the adjust body cannot be performed smoothly when adjusting the axial position of the spool brake device. At the same time, if the adjust body is increased in size in order to facilitate the operation thereof, then the side plate is also increased in size to thereby increase the size of the whole device, which results in the worsened reel gripping and operating efficiency.

SUMMARY OF THE INVENTION

In view of the above conventional circumstances, the present invention aims at eliminating the drawbacks found in the conventional backlash preventive device. Accordingly, it is an object of the invention to provide a backlash preventive device for use in a dual bearing type reel for fishing including a unit body removably fitted into one side plate of a reel main body in order to be able to replace a spool, which facilitates the adjusting operation of a spool brake force due to magnets and can also reduce the size of the reel.

In attaining the above-noted and other objects, according to the invention, there is provided a backlash preventive device for use in a dual bearing type reel for fishing which includes a spool supported rotatably between the two side plates of a reel main body, a conductor provided on the spool and rotatable in linking with the spool and a spool brake device disposed in the reel main body for allowing the conductor to generate an eddy current, in which there is formed in the opposite side plate to a handle a through hole for allowing the insertion and removal of the spool, a unit body including the spool brake device and a bearing portion for supporting the one end portion of a spool shaft is removably fitted into the through hole, and an adjust body for adjusting the spool brake device provided in the unit body is rotatably supported in the central portion of the unit body. The fitting means for fitting the unit body with the side plate in a removable manner includes threadedly fitting means and means which uses securing projections and engaging recesses respectively engageable with the securing projections.

According to the invention, the adjusting operation to adjust the strength of the spool brake force of the spool brake device is performed by rotating the adjust body supported rotatably in the central portion of the unit body which is removably fitted with the side plate, and the replacement of the spool is achieved by fitting the unit body into the side plate and removing the same therefrom.

DETAILED DESCRIPTION OF THE PREFERRED EMBODIMENTS

The preferred embodiments of a backlash preventive device according to the invention will be described with reference to the accompanying drawings.

Figure 1:
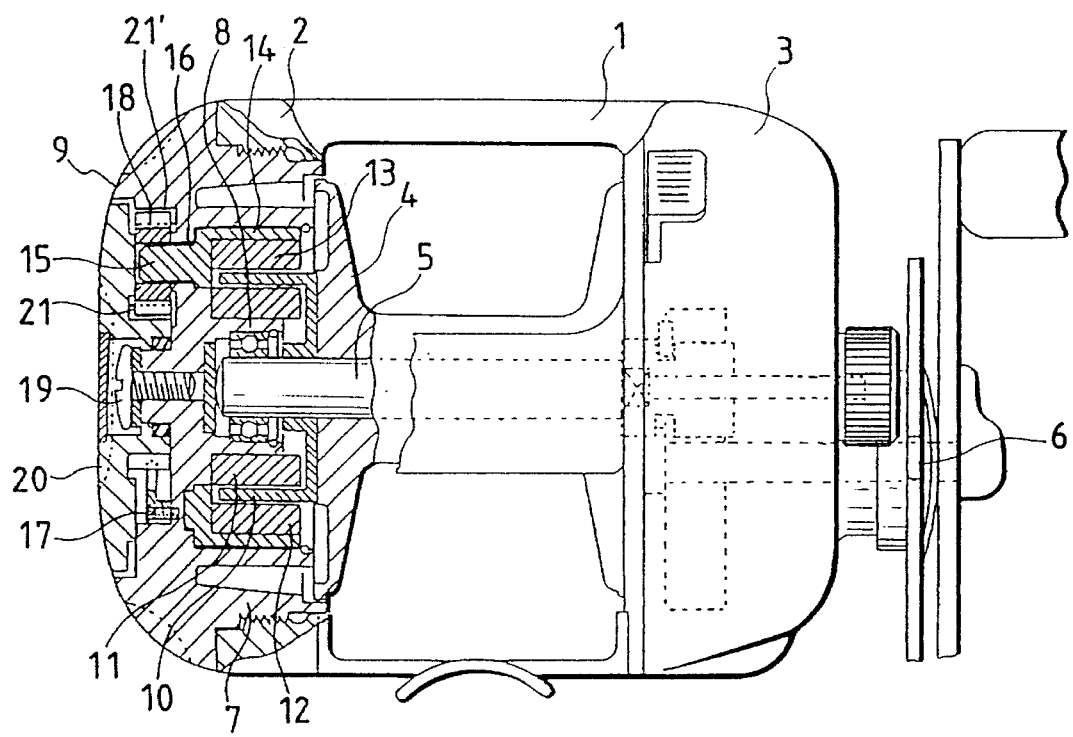
FIG. 1 is a partially cutaway front view of a first embodiment of a backlash preventive device according to the invention.
Figure 2:
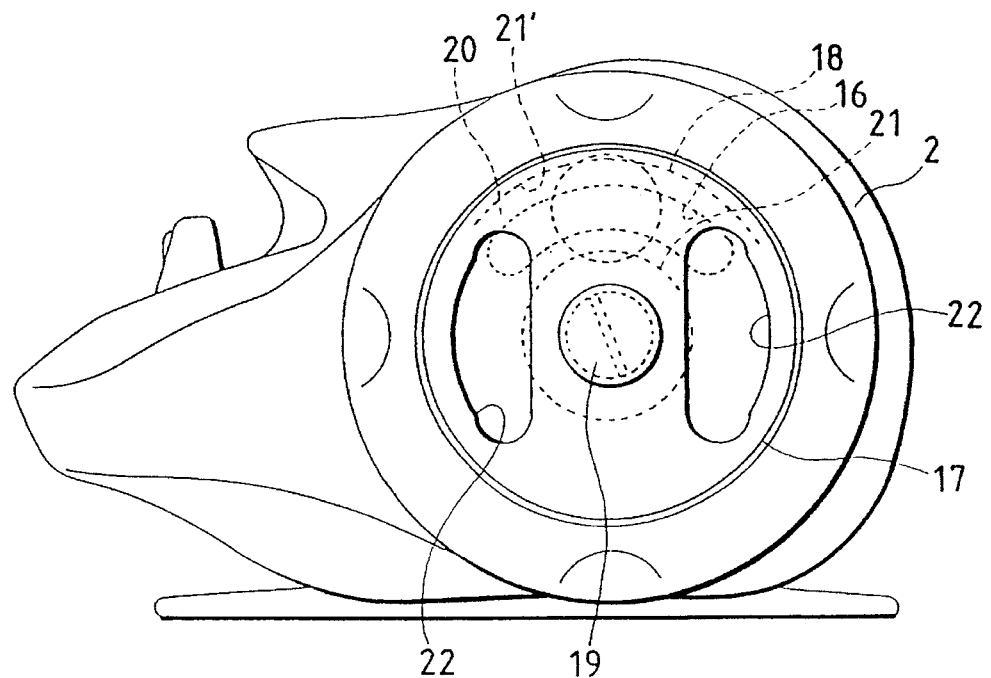
FIG. 2 is a side view of the first embodiment.
Figure 3:
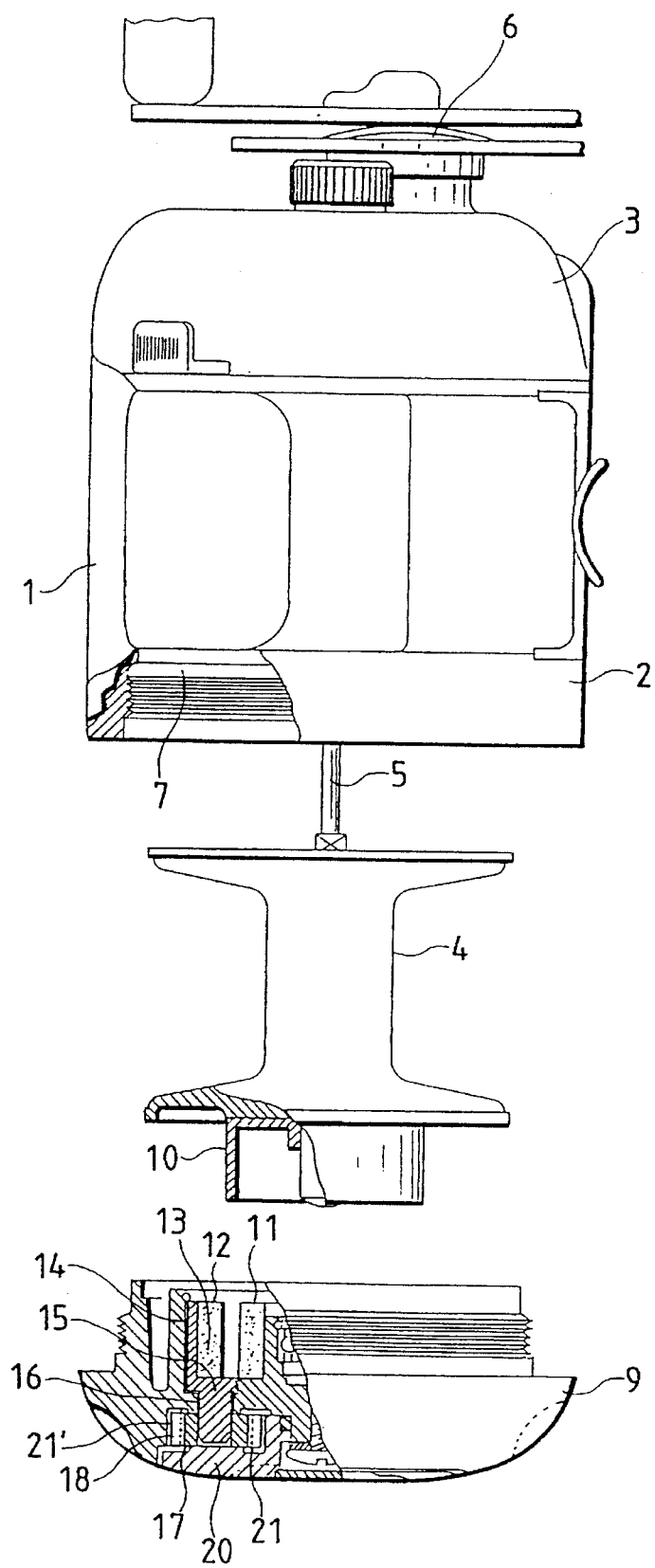
FIG. 3 is an explanatory view of replacement of a spool employed in the first embodiment.

FIGS. 1 to 3 show a first embodiment of the present invention. A spool shaft 5 with a spool 4 fixed thereto is rotatably supported between the side-plates 2 and 3 of a reel main body 1, and the spool shaft 5 is, as well-known, connected to a handle shaft 6 through a linking mechanism and a clutch mechanism, so that the spool 4 can be rotated by means of the rotation of the handle shaft 6 and also the spool 4 can be rotated freely therefrom with the aid of the disconnection of the clutch mechanism.

In the side plate 2, there is formed a through hole 7 in such a manner that the spool 4 together with the spool shaft 5 can be taken out laterally therefrom. Also, a unit body 9 including a bearing portion 8 provided in the central portion thereof for supporting one end portion of the spool shaft 5 is engaged with the through hole 7 threadedly and removably. Further, an annular conductor 10 is fixed to the spool 4 on the side of the side plate 2. There is disposed, in the unit body 9, a spool brake device 13 made $u_R$ of two magnets 11 and 12 adapted to confront with the inner and outer peripheral side portions of the conductor 10. More specifically, the magnet 11 is fixed to the outside of the bearing portion 8 and the magnet 12 is fixed to the inside of a rotary frame 14 which is rotatably fitted with the unit body 9. The rotary frame 14 includes a rotary rod 15 which projects therefrom outwardly and is fitted into an arc-shaped elongated hole 16 formed in the unit body 9. The rotary rod 15 supports a gear 18 at the external end portion thereof in such a manner that the gear 18 can be rotated within an annular recessed portion 17 formed in the outside of the unit body 9.

An adjust body 20 is rotatably mounted by a pin 19 on the annular recessed portion 17 of the unit body 9 and arranged coaxially with respect to the bearing portion 8. On the outer peripheral portion of the mounting boss portion of the adjust body 20 there are formed meshing teeth 21 which can mesh with the gear 18, and on the inner peripheral portion of the annular recessed portion 17 of the unit body 9 there are formed another meshing teeth 21 which are also meshable with the gear 18. These components constitutes a power transmission mechanism by use of a planetary gear. Now, in the drawings, reference character 22 designates a recessed portion for rotation which is formed in the adjust body 20.

In the backlash preventive device according to the invention, if the adjust body 20 is rotated, then the gear 18 moves along the elongated hole 16 while it is rotating on its own axis through the meshing teeth 21 and 21' thanks to the power transmission mechanism using a planetary gear to thereby rotate the rotary frame 14, and thus the magnet 12 varies in its opposing position to the magnet 11 to thereby adjust an eddy current to be generated in the conductor 10, so that the strength of the brake force of the spool 4 can be adjusted. To replace the spool 4 with a new one, the threaded portions of the unit body 9 and side plate 2 are rotated to thereby disconnect the unit body 9 therefrom, so that the old spool 4 can be removed and a new one can be mounted by means of the through hole 7.

Figure 4:
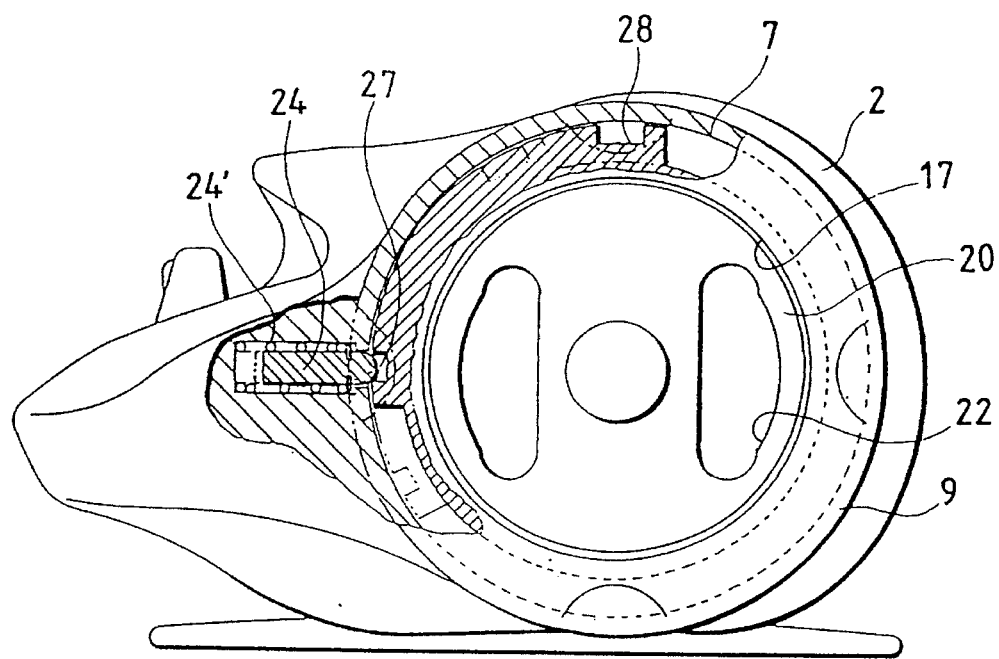
FIG. 4 is a partially cutaway side view of a second embodiment of a backlash preventive device according to the invention.
Figure 5:
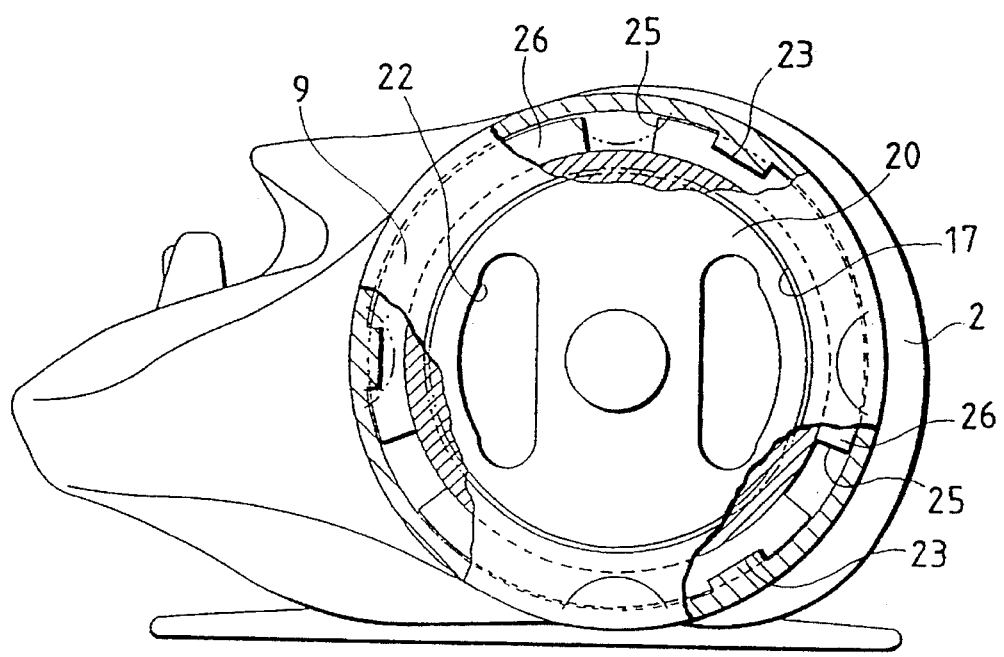
FIG. 5 is a partially cutaway side view of the second embodiment.
Figure 6:
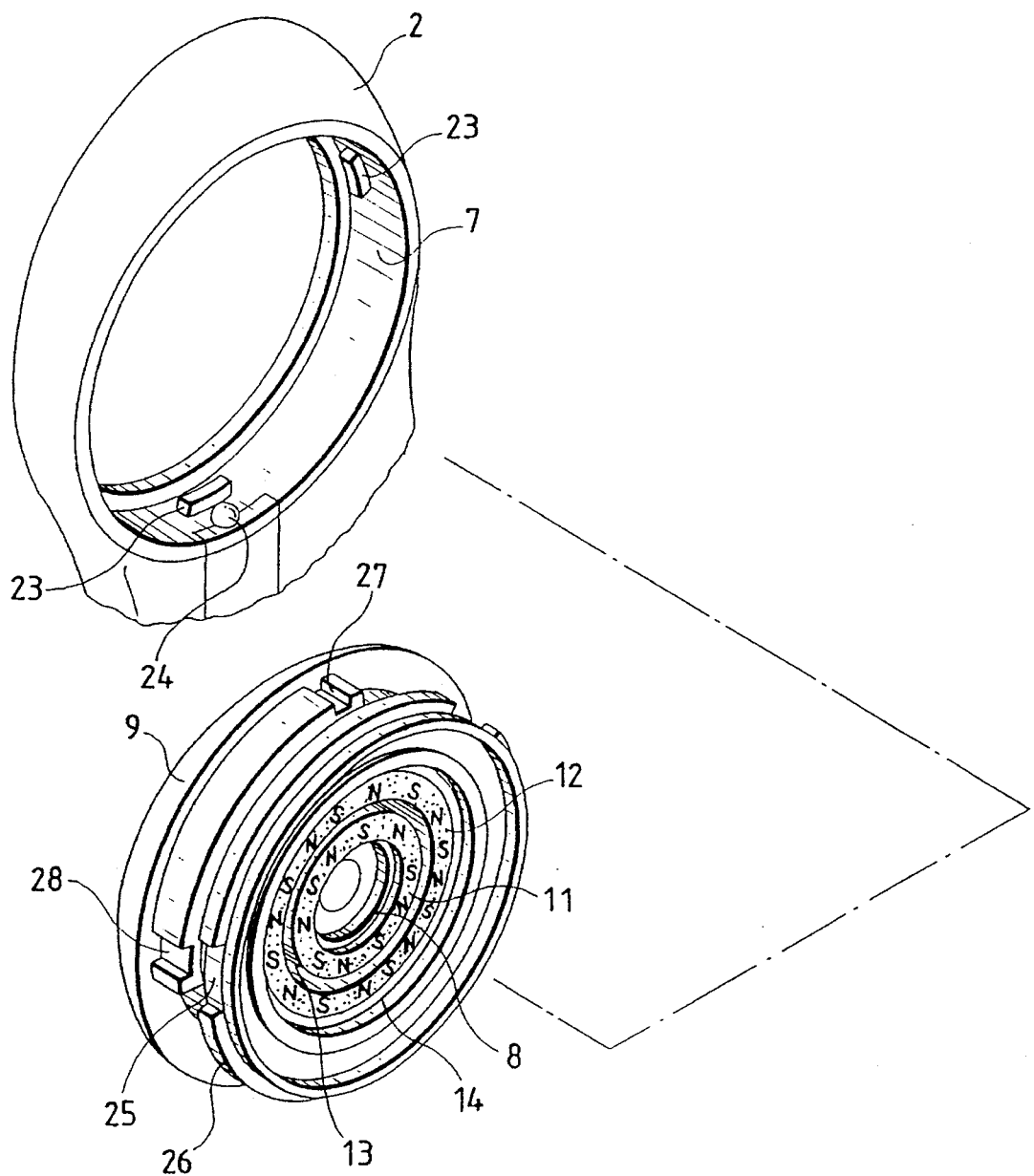
FIG. 6 is an explanatory view of replacement of a spool employed in the second embodiment.

In FIGS. 4 to 6, there is shown another embodiment of a backlash preventive device according to the invention. In this embodiment, as means for removably mounting the unit body 9 onto the side plate 2, there is employed mounting and removing means which is disclosed in Japanese Utility Model Unexamined Publication No. Hei. 3-76464 and comprises securing projections and engaging recesses respectively engageable with the securing projections. That is, the mounting and removing means comprises a proper number of securing shoulder portions 23 respectively provided on and projecting from the inner peripheral surface of the through hole 7 of the side plate 2, a securing pin 24 energized toward the central portion of the diameter direction of the through hole 7 by a spring 24' to be projectable freely from the inner peripheral surface of the through hole 7, an engaging flange 26 provided on and projecting from the outer peripheral surface of the unit body 9 and including a proper number of notched portions 25 respectively engageable with the insides of the securing shoulder portions 23 when the unit body 9 is fitted into the through hole 7, and a securing recess 27 and a non-securing recess 28 respectively engageable with the securing pin 24. The notched portion 25 is formed in such a manner that the securing shoulder portion 23 can be inserted therethrough. Also, while the securing pin 24 is in engagement with the securing recess 27, the engaging flange 26 is in engagement with the securing shoulder portion 23, and, while the securing pin 24 is in engagement with the non-securing recess 28, the notched portions 25 of the engaging flange 26 are in engagement with the securing shoulder portions 23.

According to the invention, due to the fact that a unit body is removably fitted into a-side plate of a reel main body in order to replace an old spool with a new one, and further an adjust body for adjusting a spool brake device allowing generation of an eddy current is rotatably supported in the central portion of the unit body removably fitted into the side plate, when a spool replacement operation by means of mounting and removal of the unit body and a spool brake force adjusting operation by means of rotation of the adjust body are performed, the adjust body can be held in a sufficient size to thereby be able to perform the adjust body rotational adjusting operation smoothly and easily as well as to reduce the size of the reel so as to improve the reel gripping and operation performance. That is, the present invention can provide excellent characteristics and practical uses.

What is claimed is:

1. A backlash preventive device in combination with a dual bearing type fishing reel having a spool supported rotatably between two side plates of a reel main body and a through-hole formed through one of said side plates for permitting replacement of said spool from said main body, said device comprising:

a conductor rotatable in linking with said spool; and a unit body removably fitted into said through-hole, and including:

a bearing portion for supporting one end of a spool shaft of said spool;

a spool brake device for generating an eddy current in cooperation with said conductor;

an adjust body for adjusting an amount of generation of said eddy current, said adjust body being rotatably supported on said unit body substantially coaxially with respect to said bearing portion; and a gear disposed between said adjust body and said spool brake.

2. The device according to claim 1, wherein said spool brake device includes a pair of annular magnets arranged so that said conductor is radially interposed therebetween when said unit body is fitted into said through-hole.

3. The device according to claim 2, wherein said spool brake device further includes:

a rotary frame on which one of said annular magnets is fixed and which has a rod portion movably fitted into an arcuate elongated hole formed in said unit body;

a planetary gear rotatably supported on an end of said rod portion;

an internal gear formed on said unit body so as to mesh with said planetary gear; and an external gear formed on said adjust body so as to mesh with said planetary gear.

4. The device according to claim 2, wherein one of said magnets is fixed on said unit body, and the other of said magnets is circumferentially movable relative to said unit body.

5. The device according to claim 1, wherein said body is removably fitted into said through-hole by a threading engagement therebetween.

6. The device according to claim 1, wherein said unit body includes:

an outer peripheral surface and;

a securing recess formed on said outer peripheral surface; said through hole of said side plate including:

an inner peripheral surface and;

a securing shoulder portion protecting from said inner peripheral surface; said securing shoulder engaging said securing recess to removably fit said unit body into said through hole.

7. A backlash preventive device in combination with a dual bearing type fishing reel having a spool supported rotatably between two side plates of a reel main body and a through-hole formed through one of said side plates for permitting replacement of said spool from said main body, said device comprising:

a conductor rotatable in linking with said spool; and a unit body removably fitted into said through-hole, and including:

a bearing portion for supporting one end of a spool shaft of said spool;

a spool brake device for generating an eddy current in cooperation with said conductor; and an adjust body for adjusting an amount of generation of said eddy current, said adjust body engaging a planetary gear, said planetary gear disposed between said adjust body and said unit body.

8. A backlash preventive device as described in claim 7, wherein said spool brake device further includes:

a rotary frame having a rod portion movably fitted into an arcuate elongated hole formed in said unit body, said planetary gear rotatably supported on an end of said rod portion;

an internal gear formed on said unit body so as to mesh with said planetary gear;

an external gear formed on said adjust body so as to mesh with said planetary gear.

* * * * *